No. 881,876. PATENTED MAR. 10, 1908.
P. VÖLKER.
ANTIFRICTION THRUST BEARING.
APPLICATION FILED MAY 23, 1906.
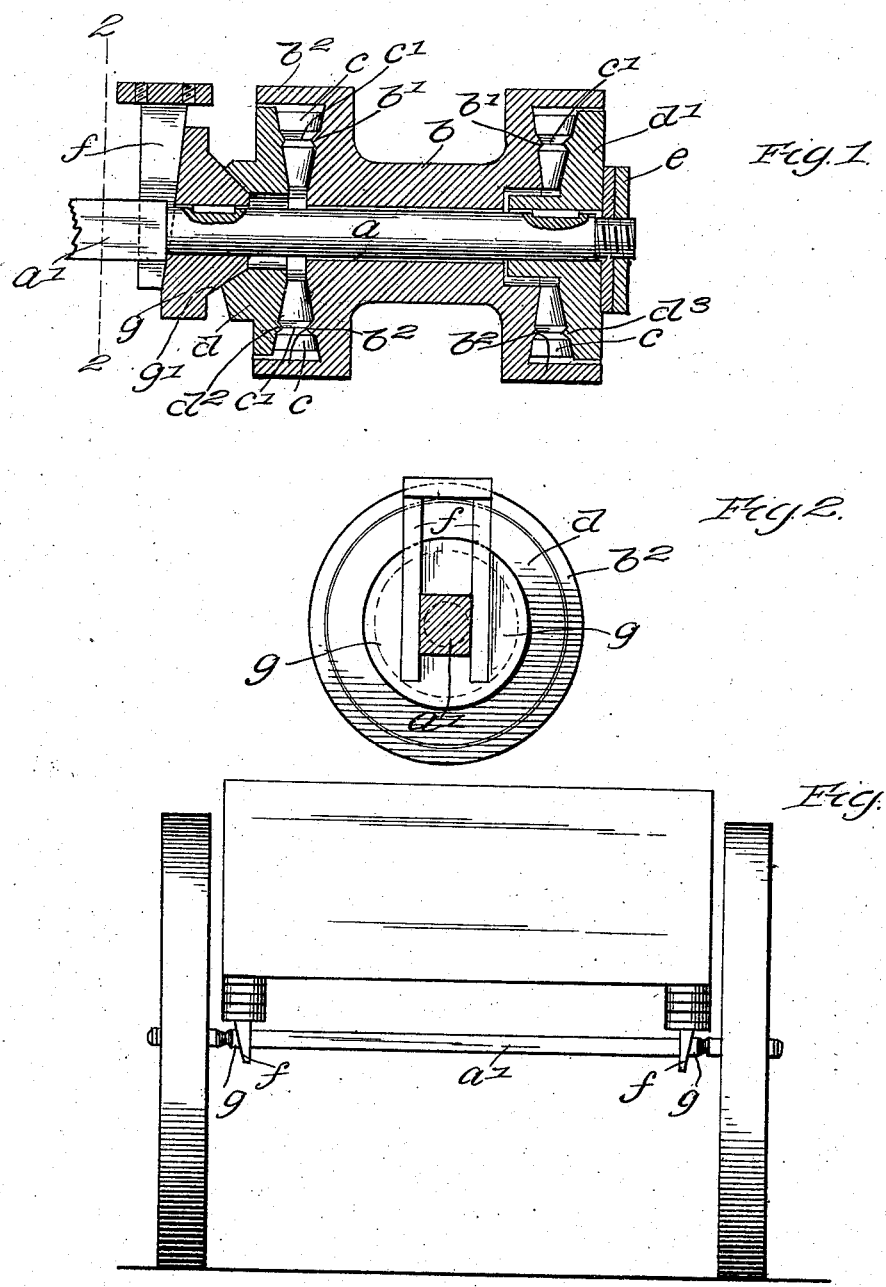

UNITED STATES PATENT OFFICE.

PETER VÖLKER, OF COLOGNE, GERMANY, ASSIGNOR TO PETER HEYARTZ, OF COLOGNE, GERMANY.

ANTIFRICTION THRUST-BEARING.

No. 881,876.　　　Specification of Letters Patent.　　Patented March 10, 1908.

Application filed May 23, 1906. Serial No. 318,380.

*To all whom it may concern:*

Be it known that I, PETER VÖLKER, a subject of the Emperor of Germany, and resident of Cologne-on-the-Rhine, in the Empire of Germany, have invented certain new and useful Improvements in Antifriction Thrust-Bearings, of which the following is a specification.

This invention relates to improvements in antifriction thrust-bearings adapted for use in connection with a vehicle, windlass or the like, and consists in the provision of a rotating member and a thrust member and a plurality of conical antifriction rollers interposed between said members.

The invention will be more fully described in connection with the accompanying drawing and will be more particularly pointed out and ascertained in and by the appended claims.

In the drawing: Figure 1 shows an embodiment of my invention as applied to a vehicle, the figure showing a longitudinal section of one axle and its operative parts. Fig. 2 is a section on line 2—2 of Fig. 1. Fig. 3 is a rear view of the vehicle showing the device of my invention applied thereto.

Like characters of reference designate similar parts throughout the different figures of the drawing.

$a$ designates the axle of the vehicle which in the present construction is non-rotatively mounted. Said axle is of polygonal cross section at $a'$ and is adapted to slide between guiding members $f$ rigidly secured to the body of the vehicle. The outer faces of the guiding members $f$ are inclined with respect to the vertical and adapted to engage a similarly inclined face of a thrust block $g$ which, as shown, is non-rotatively mounted on the axle $a$, said mounting permitting slight longitudinal movement of the thrust block. The outer end of said axle is provided with a retaining device in the form of a nut and lock nut $e$. Interposed between the nuts $e$ and the block $g$ are thrust disks $d$ $d'$, the latter disk bearing against the nuts $e$ and being non-rotatively mounted on the axle and slidable longitudinally thereof, the former disk $d$ being fitted on a conical portion $g'$ of the block $g$, said inner disk being out of contact with the axle. A part $b$ forming one of the members of the bearing, and in the present case the hub of the wheel, is located intermediate the thrust disks $d$ and $d'$. As shown the hub $b$ is mounted on the axle $a$ with a slight clearance and is revolubly supported upon antifriction conical rollers $c$ radially disposed between the thrust disks and the hub. Each of said rollers $c$ is provided with an annular recessed portion $c'$ into which annular projecting flanges $b'$, and $d^2$ and $d^3$ fit. The hub $b$ is provided with annular flanges $b^2$ which overhang the rollers and thrust bearings $d$ and $d'$.

It will be obvious from the foregoing that as the weight of the body of the vehicle depresses the guides $f$, the inclined faces thereof will thrust the block $g$ outwardly against the innermost disk $d$ and the latter through the rollers $c$ and the hub $b$ thrusting the outer disk $d'$ tightly against the lock nuts $e$ thereby supporting the hub $b$ non-rotatively upon the thrust disks $d$, $d'$ and out of contact with the axle $a$. It will be further obvious that as the weight of the body of the vehicle is increased the outward thrust of the guides $f$ upon the block $g$ will likewise be increased, this increase of pressure, however, will not increase the friction owing to the rollers $c$, the recessed portion $c'$ and annular flanges $b'$ holding the hub $b$ and the disks $d$, $d'$ at all times in prescribed relation.

What I claim is:—

1. In combination, a body, guide members rigidly secured to said body and provided with outwardly disposed inwardly inclined engaging faces, a shaft having portions movably fitting said guide members, thrust blocks non-rotatively and slidably mounted on said shaft and provided with inclined faces adapted to be engaged by the inclined faces of said guide members, inner thrust disks operatively supported by said blocks out of engagement with said shaft, outer thrust disks non-rotatively and slidably mounted on said shaft, means for adjusting and retaining said outer disks in position, a hub member interposed between said thrust disks, and radially disposed rollers interposed between said disks and said hub member.

2. In combination, a body, bifurcated guide members rigidly secured to said body and provided with outwardly disposed inwardly and downwardly inclined operating surfaces, a shaft having polygonal portions slidably and non-rotatively positioned in said bifurcated guides, thrust blocks non-rotatively and slidably mounted on said shaft and provided with inclined operating faces adapted to be engaged by the inclined guide faces and having conical engaging portions, outer thrust disks non-rotatively and slidably mounted on said shaft, means for adjusting and retaining said outer disks in position, inner thrust disks having conical engaging surfaces adapted to be supported by said thrust blocks out of engagement with the shaft, a hub member interposed between said thrust disks and adapted to be retained out of engagement with the shaft, said thrust disks and hub members having annular flanges, and radially disposed rollers having annular recesses adapted to be engaged by said flanges, said rollers being interposed between said thrust disks and hub members.

3. In combination, a body, bifurcated guide members rigidly secured to said body and provided with outwardly disposed inwardly and downwardly inclined operating surfaces, a shaft having polygonal portions slidably and non-rotatively positioned in said bifurcated guides, thrust blocks non-rotatively and slidably mounted on said shaft and provided with inclined operating faces adapted to be engaged by the inclined guide faces and having conical engaging portions, outer thrust disks mounted on said shaft, inner thrust disks having conical engaging surfaces adapted to be supported by said thrust blocks out of engagement with the shaft, a hub member interposed between said thrust disks and adapted to be retained out of engagement with the shaft, said thrust disks and hub members having annular flanges, and radially disposed rollers having annular recesses adapted to be engaged by said flanges, said rollers being interposed between said thrust disks and hub members.

4. In combination, a body, bifurcated guide members rigidly secured to said body and provided with outwardly disposed inwardly and downwardly inclined operating surfaces, a shaft having polygonal portions slidably and non-rotatively positioned in said bifurcated guides, thrust blocks non-rotatively and slidably mounted on said shaft and provided with inclined operating faces and having conical engaging portions, outer thrust disks mounted on said shaft, inner thrust disks having conical engaging surfaces adapted to be supported by said thrust blocks out of engagement with the shaft, a hub member interposed between said thrust disks and adapted to be retained out of engagement with the shaft, and radially disposed rollers interposed between said thrust disks and hub members.

5. In combination, a body, bifurcated guide members rigidly secured to said body and provided with operating surfaces, a shaft slidably and non-rotatively mounted in said guide members, thrust blocks non-rotatively and slidably mounted on said shaft and provided with guide operating surfaces adapted for engagement with said guides and also provided with disk operating surfaces, outer thrust disks mounted on said shaft, inner thrust disks provided with operating surfaces adapted to engage the disk operating surfaces of said blocks, hub members interposed between said disks, and radially disposed rollers interposed between said disks and hub members.

6. In combination, a body, a shaft therefor, outer thrust disks slidably and non-rotatively mounted on said shaft, means for adjusting and retaining said disks in position, inner thrust disks, hub members interposed between said disks, antifriction rollers interposed between said disks and hub members, and means whereby the weight of the body serves to retain said parts in operative relation.

7. In combination, a body, a shaft therefor, outer thrust disks mounted on said shaft, inner thrust disks, hub members interposed between said disks, antifriction rollers interposed between said hub members, and means whereby the weight of the body may serve to retain said members in operative relation.

In testimony whereof I affix my signature in presence of two witnesses.

PETER VÖLKER.

Witnesses:
JOHANN WELLER,
LOUIS VANDORN.